US010509703B1

(12) United States Patent
Ravid et al.

(10) Patent No.: US 10,509,703 B1
(45) Date of Patent: Dec. 17, 2019

(54) EXTERNAL BACKUP AND INSTANT RECOVERY SYSTEM FOR A COMPUTER

(71) Applicants: Gonen Ravid, Chatsworth, CA (US); Josef Rabinovitz, Chatsworth, CA (US)

(72) Inventors: Gonen Ravid, Chatsworth, CA (US); Josef Rabinovitz, Chatsworth, CA (US)

(*) Notice: Subject to any disclaimer, the term of this patent is extended or adjusted under 35 U.S.C. 154(b) by 0 days.

(21) Appl. No.: 16/169,976

(22) Filed: Oct. 24, 2018

Related U.S. Application Data

(60) Provisional application No. 62/577,132, filed on Oct. 25, 2017.

(51) Int. Cl.
| *G06F 11/00* | (2006.01) |
| *G06F 11/14* | (2006.01) |
| *H04W 12/06* | (2009.01) |
| *H04W 4/80* | (2018.01) |

(52) U.S. Cl.
CPC ...... *G06F 11/1451* (2013.01); *G06F 11/1417* (2013.01); *G06F 11/1456* (2013.01); *G06F 11/1469* (2013.01); *H04W 12/06* (2013.01); *H04W 4/80* (2018.02)

(58) Field of Classification Search
CPC ............ G06F 11/1456; G06F 11/1417; G06F 11/1469; G06F 11/1461; G06F 11/1446; G06F 11/2053; G06F 11/2056; G06F 9/44; G06F 9/4411; G06F 9/445
See application file for complete search history.

(56) References Cited

U.S. PATENT DOCUMENTS

| 5,276,865 | A | * | 1/1994 | Thorpe | G06F 11/1456 |
| | | | | | 713/330 |
| 6,160,873 | A | * | 12/2000 | Truong | G06F 1/26 |
| | | | | | 379/102.02 |
| 6,816,982 | B2 | | 11/2004 | Ravid | |
| 7,137,034 | B2 | * | 11/2006 | Largman | G06F 11/1417 |
| | | | | | 714/23 |
| 7,302,579 | B1 | * | 11/2007 | Cain | G06F 11/1456 |
| | | | | | 713/155 |
| 7,349,719 | B2 | * | 3/2008 | Buniatyan | G06F 11/1456 |
| | | | | | 455/414.1 |
| 7,865,351 | B2 | * | 1/2011 | Mardiks | G06F 9/45512 |
| | | | | | 703/13 |
| 7,921,258 | B1 | | 4/2011 | Panabaker | |
| 8,626,971 | B1 | * | 1/2014 | Lee | G06F 11/3065 |
| | | | | | 369/47.12 |
| 9,128,928 | B2 | * | 9/2015 | Lee | G06F 11/3065 |

(Continued)

OTHER PUBLICATIONS

How can a screen sense touch? A basic understanding of touch panels, Sep. 27, 2010, EIZO (Year: 2010).*

(Continued)

*Primary Examiner* — Marc Duncan
(74) *Attorney, Agent, or Firm* — Lance M. Pritikin (57) ABSTRACT

Improved apparatus and system for the backup and recovery of a computer system with minimized key strokes and steps for a user. The improved apparatus and system includes an external hard drive, power controls, keyboard controller, and flash drive, all of which are referred to as the present invention DittoDrive™, to allow a user to copy the contents of a computer hard drive to a second hard drive and then allow the user to operate the computer from either the first hard drive or the second hard drive.

21 Claims, 7 Drawing Sheets

(56) References Cited

U.S. PATENT DOCUMENTS

| | | | |
|---|---|---|---|
| 9,921,762 B2 | 3/2018 | Amidi | |
| 9,996,284 B2 | 6/2018 | Lee | |
| 2004/0184174 A1* | 9/2004 | Woo | G11B 25/043 360/39 |
| 2005/0289260 A1* | 12/2005 | Hamer | G06F 11/1456 710/74 |
| 2006/0007151 A1* | 1/2006 | Ram | G06F 3/03543 345/163 |
| 2006/0288057 A1* | 12/2006 | Collins | G06F 11/1456 |
| 2008/0140959 A1* | 6/2008 | Popell | G06F 1/1632 711/161 |
| 2011/0004459 A1* | 1/2011 | Collins | G06F 3/0605 703/24 |
| 2012/0260039 A1* | 10/2012 | Yao | G06F 11/1456 711/115 |
| 2016/0306704 A1* | 10/2016 | Smith | G06F 9/4411 |
| 2018/0349228 A1* | 12/2018 | Goodman | G06F 11/1451 |

OTHER PUBLICATIONS

Maxfield, Max, ASIC, ASSP, SoC, FPGA—What's the Difference?, Jun. 23, 2014, EE Times (Year: 2014).*

Baker, Simon, LED Backlighting, Nov. 11, 2010, TFT Central (Year: 2010).*

Nexto NSB-25, Dec. 21, 2016 (retrieved via Web Archive), Nexto (Year: 2016).*

Valsaraju, Hridya et al., Implementing high speed USB functionality with FPGA- and ASIC-based designs, Oct. 18, 2011, EE Times (Year: 2011).*

* cited by examiner

EXTERNAL BACKUP AND INSTANT RECOVERY SYSTEM FOR A COMPUTER

CROSS-REFERENCE TO RELATED APPLICATION

This patent application claims priority to Provisional Application Ser. No. 62/577,132 filed on Oct. 25, 2017.

BACKGROUND OF THE INVENTION

I. Field of the Invention

The field of the invention relates to computer memory storage, backup and recovery of a computer. Specifically, the field of the invention relates to an apparatus and system for more easily storing and retrieving copies or clones of a computer hard drive for disaster recovery and backup.

2. Description of the Prior Art

The inventors are aware of systems that are presently available. Gonen Ravid, one of the inventors of the present invention, is the inventor of the invention disclosed and claimed in U.S. Pat. No. 6,816,982 issued on Nov. 9, 2004. U.S. Pat. No. 6,816,982 discloses a method of and apparatus for computer hard disk drive (HDD) protection and recovery. The apparatus includes an HDD controller board and a back-up HDD, both installed in a computer system having a working HDD. The apparatus utilizes hardware switches electrically coupled to the controller board, including an HDD selection switch and a copy command button.

Prior to filing this full patent application, a patent novelty search was conducted. The following four (4) patents and published patent applications are the closest prior art references which were located in the search:

1. U.S. Pat. No. 7,921,258 issued to Ruston J. D. Panabaker on Apr. 5, 2011 for "Nonvolatile Disk Cache for Data Security" (hereafter the "Panabaker Patent");
2. United States Published Patent Application No. 2012/0260039 to William Weihan Yao et al. on Oct. 11, 2012 for "Method and a Removable Device for Backing Up and Restoring a Host Device" (hereafter the "Yao Published Patent Application");
3. U.S. Pat. No. 9,921,762 issued to Mike Hossein Amidi et al. on Mar. 20, 2018 for "Redundant Backup Using Non-Volatile Memory" (hereafter the "Amidi Patent");
4. U.S. Pat. No. 9,996,284 issued to Hyun Lee on Jun. 12, 2018 for "Non-Volatile Memory Storage for Multi-Channel Memory System" (hereafter the "Lee Patent").

The Panabaker Patent

"Described is a technology by which a secondary non-volatile storage (e.g., a flash memory device) maintains a copy of the changes made to a hard drive after a data backup operation. The backup changes are combinable with backed up data to recreate a hard drive state, whereby changes after the last backup are not lost, e.g., if the hard drive fails. The backup change data may maintain the changes at the block (e.g., allocation unit) level corresponding to hard drive blocks, or at the file level, corresponding to files or parts of files on the hard drive. The backup changes may be filtered, so that only certain data (e.g., user data) are maintained as backup change data. Read requests can be satisfied by reading data from the backup change data, or from a performance (e.g., disk) cache that may also reside on the nonvolatile storage."

The Yao Published Patent Application

The Yao Published Patent Application was published in October 2012 and has since gone abandoned. This patent publication is similar in concept to your invention. Specifically, the published patent application discloses:

"A method and a removable device for backing up/restoring a host device are disclosed. A portable application is resident in a removable device, which is external to the host device and is capable of being electrically coupled to the host device. The portable application is launched to the host device after the removable device is coupled to the host device. If a backup function is selected, a backup process begins by moving data to be backed up from the host device to the removable device; and if a restore function is selected, a restore process begins by moving data to be restored from the removable device to the host device."

The Amidi Patent

The Amidi Patent issued on Mar. 20, 2018 and discloses: "Data stored in a volatile memory subsystem is backed up redundantly into first and second channels of a non-volatile memory subsystem. The data is retrieved from the volatile memory subsystem upon detection of a trigger condition indicative of real or imminent power loss or reduction and multiple copies are stored in dedicated non-volatile memory channels. The stored copies may be error checked and corrected, and re-written if necessary. The redundantly backed up data can be subsequently retrieved from the non-volatile memory subsystem, error-corrected, and an error-free copy communicated to the volatile memory subsystem."

The Lee Patent

The Lee Patent issued on Jun. 12, 2018 and has a long prosecution history as does the Amidi Patent (as set forth above). Referring to Column 6 beginning on Line 22 and continuing to Column 7 Line 4, the patent states:

"In certain embodiments, the interface 211 snoops a first set of data, address, and control signals from one or more of channels ch.sub.1-ch.sub.n 209, and transmits a second set of data, address, and control signals via one or more of the signal buses 206.sub.1-206.sub.n. The second set of data, address, and control signals is generated based on the first set of data, address, and control signals. In one embodiment, the second set of data, address, and control signals is a copy of the first set of data, address, and control signals. In one embodiment, one or more of data signals, address signals, and control signals of the first set of data, address, and control signals are processed by interface 211 before being transmitted as part of the second set of data, address, and control signals. For example, the interface 211 can include a serializer/deserializer (or SERDES) (not shown) in order to receive, process, format, and transmit data signals, address signals, or control signals using a serial interface or a parallel interface. In certain embodiments, the memory module channels ch.sub.1-ch.sub.n 209 include a parallel interface, while the signal bus 206.sub.1-206.sub.n include one or more of a serial interface and a parallel interface. In certain embodiments, the interface 211 is operable to process, replicate, regenerate, modify, delay, format, compress, error check, or generate one or more of data signals, address signals, and control signals of the second set of data, address, and control signals based on one or more of data signals, address signals, and control signals of the first set of data, address, and control signals. In certain embodiments, the interface 211 is coupled to the NV controller 204 via a single common signal bus instead of the separated signal bus 206.sub.1-206.sub.n, wherein the interface 211 manages and control communication of data, address, and/or control signals from/to the NV memory subsystem 205 to/from at least one of the memory control module 205 and one or more memory modules that are coupled to one or more of channels ch.sub.1-ch.sub.n 209."

SUMMARY OF THE INVENTION

The present invention is an improved external backup and recovery system for a computer. It is an object of the present invention to provide an external backup and instant recovery system that can be used regardless of a user's skill.

The present invention is different and an improvement over U.S. Pat. No. 6,816,982 and other prior art by providing a user with an external apparatus and system that allows a user to clone the contents of a computer hard drive to a second hard drive and then allow the user to operate the computer from either the first hard drive or the clone of the first hard drive (second hard drive). This system allows the user to check to see if a backup or clone was done correctly. This is a unique feature of the present invention, allowing a user to test the backup or clone of his computer hard drive instantaneously by booting from it.

The present invention is also an improvement over the prior art by adding a keyboard component and a flash drive. The keyboard component is an improvement over the prior art by providing a simplistic means for any user, regardless of skill, to backup or clone a hard drive, reboot from the created backup hard drive, and restore a computer's hard drive with a prior created clone. The system also does not require special keystrokes such as pressing and holding keys (F11 or F12 on a PC computer and L-Alt on a MAC computer or other similar key stroke combinations that are used in operating systems) to access advanced startup options.

It is a further object of the present invention to provide an apparatus and system that includes an external hard drive, power controls, keyboard controller, and flash drive to allow a user to copy or clone the contents of a computer hard drive to a second hard drive and then allow the user to operate the computer from either the first hard drive or the second hard drive.

In this patent application, the term hard drive is used to include any memory storage system in the computer including a hard drive, solid state drive, and virtual drive. The term incremental backup is referring to any changes made to the computer hard drive since the most recent clone operation The terms copy and backup are synonymous throughout this patent application. The term clone means to copy the entire content of the hard drive, including the OS, applications and user data, and make it a bootable storage device.

The term Fast Clone refers to the operation of syncing or applying all of the changes made on one drive to a second drive. If the Fast Clone is done from the PC to the DittoDrive it will apply all the changes made on the internal computer hard drive to the most recent clone made to the internal hard drive of the DittoDrive. If the Fast Clone is done from DittoDrive to the computer hard drive it will sync or applying all the changes made on the Ditto drive to the computer hard drive.

The term Ditto drive, or Ditto internal drive, or drive B is referring to the storage device, other than the Flash drive that is inside the ditto box, which is turned off by the ditto control circuit when the user uses its internal drive and is not in the process of cloning to ditto. The ditto storage device, other than the flash, could be external to the ditto box, but must be connected to the ditto box and controlled by it.

The term incremental schedule and criteria means how often the incremental back up is sent to the cloud or to Ditto internal flash and what directories are watched for changes. The default directory is all the user data. The user can add or remove directories that are monitored for changes.

At the initial installation, when a user connects to the present invention, DittoDrive™, to a computer through a USB port, DittoDrive™ will clone (make a copy of) the hard drive. This is done by pressing a button on the ditto box. It is initiated manually by the user when the computer is in working state, not corrupted and not compromised. From that point on, the DittoDrive™ software that is running in the background, will automatically do an incremental backup of the hard drive to the internal flash or to the Cloud every few minutes. If the DITTO Drive is not connected, then based upon additional cloud services, then an incremental back-up will be based to a cloud.

A unique feature of the current invention is that the internal DittoDrive, which is the 2nd storage device that is in the ditto box (not the Flash drive), is turned off by ditto controller as soon as the clone operation is completed. This is indented to protect the ditto drive from any corruption or malware, such as a virus or ransom that otherwise can take over or corrupt the external drive as well.

When a computer crashes or is compromised, a user simply reconnects DittoDrive™ through a USB port, pushes a button, and the computer will reboot and activate the boot manager and allow the user to select to boot from DittoDrive™ rather than its own corrupted hard drive. This allows a user to immediately continue working from the backup hard drive.

If the DittoDrive was not connected all the time to the user's computer then the owner of the computer needs to have the services of a cloud service and internet connection in order to allow a storage place for the incremental backup. The cloud service will save all of the incremental changes while the DittoDrive was not connected. When the DittoDrive has not been connected you have a cloud service so that all of the incremental changes are saved in the cloud. Then when you have rebooted your computer (boot manager is activated by DittoDrive and allow the user to select to boot from DittoDrive).

Ditto drive software can retrieve the incremental changes from the cloud into the computer. Then the user can perform another clone operation or Fast Clone. This will update the DittoDrive so that the incremental changes are now also saved in the DittoDrive. Therefore, the user has the following options. Rather than work from the computer, they can work from a DittoDrive if it is connected and later restore a computer or alternatively, restore the computer and then work from the restored computer.

Further novel features and other objects of the present invention will become apparent from the following detailed description and discussion.

BRIEF DESCRIPTION OF THE DRAWINGS

Referring particularly to the drawings for the purpose of illustration only and not limitation, there is illustrated.

DETAILED DESCRIPTION OF THE PREFERRED EMBODIMENTS

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention.

Descriptions of the Key Element of the DittoDrive™ Unit

Figure 1:
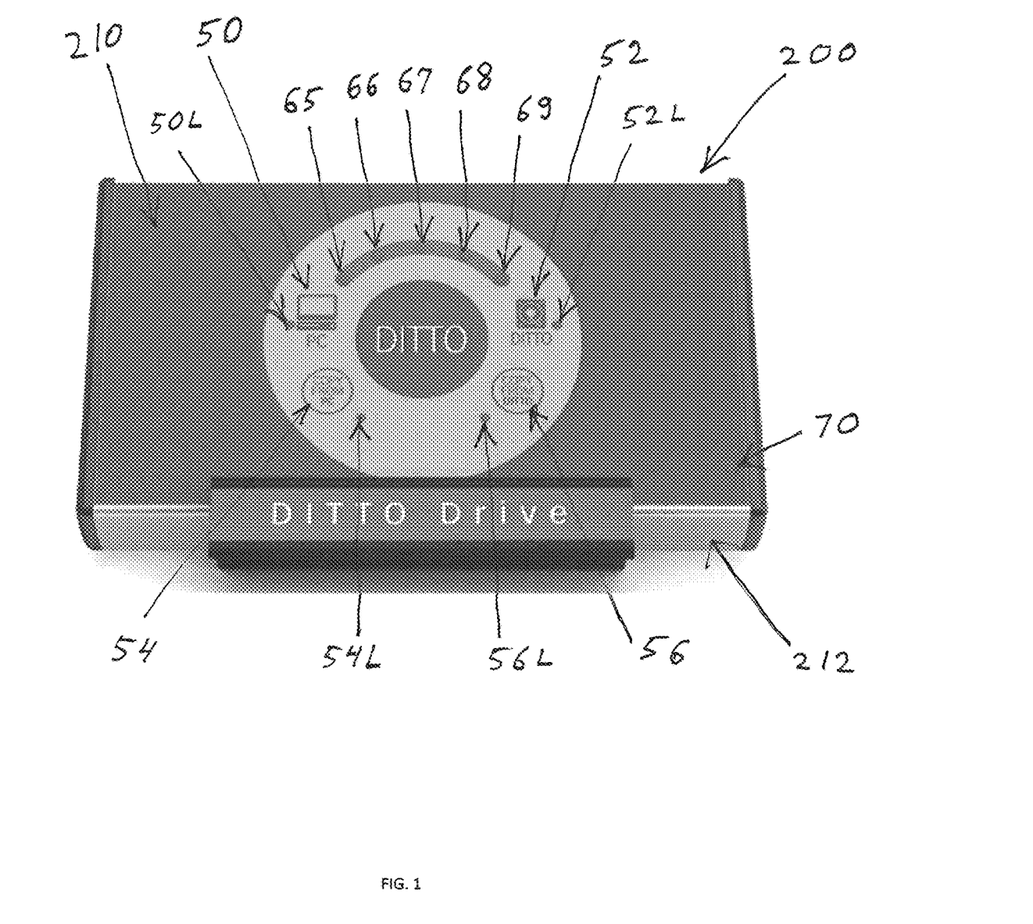
FIG. 1 is top perspective view of the apparatus used in the present invention.

Referring to FIG. 1, there is illustrated the generally rectangular shaped DittoDrive™ box (200) having a top panel (210) and a front panel (212). Top panel (210) contains a power on LED (70), a push button Switch A for PC (50), a push button Switch B for External drive B or Ditto Drive (52), a copy from PC switch (54), and a copy from ditto switch (56). Top panel (210) also contains 5 LED's (65,66, 67,68 and 69) to show the direction of the copy, either from left to right (PC to Ditto) or from right to left (Ditto to PC).

Figure 2:
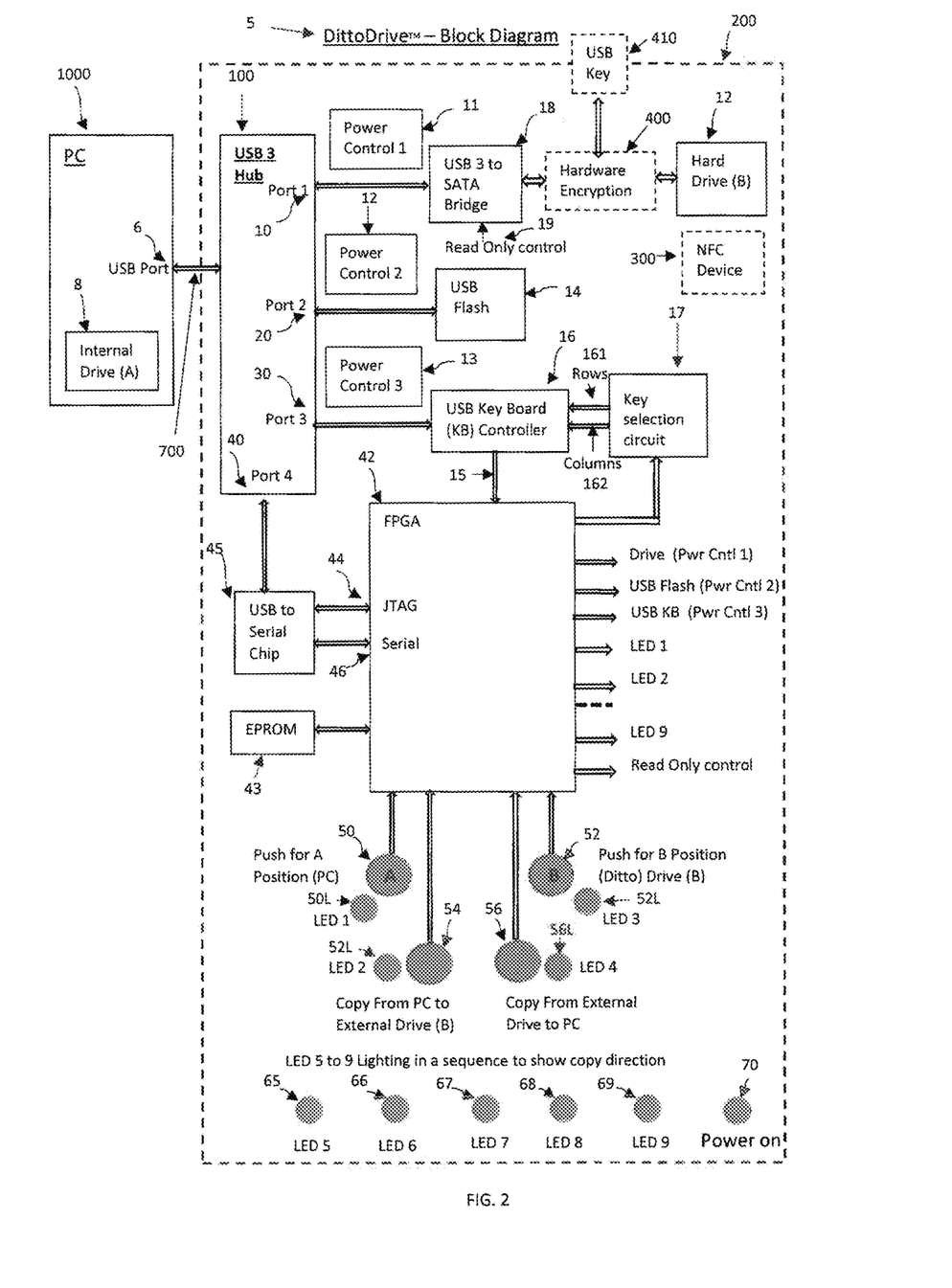
FIG. 2 is a block diagram of the present invention DittoDrive connecting to a PC or a MAC through a USB cable connection

Referring to FIGS. 1 and 2, the DittoDrive™ is connected to a computer through a standard USB port or through any comparable high speed port such as thunderbolt. When using this application, all of the various ports discussed previously in this application are deemed to be included in the description.

A USB Hub chip inside the DittoDrive™ provides four (4) USB ports. It is within the spirit and scope of the present invention for the USB chip to include more than four ports depending upon the current state of technology at the time.

Referring to FIG. 2, there is illustrated a DittoDrive™ block diagram (5) having a Port 1 (10) connected to a SATA bridge chip (18) that connect to a standard SATA drive (12). If a USB drive is used there will be no need for the bridge chip. USB drives though are not as common and are more expensive.

Port 2 (20) is connected to a USB Flash (14) (just like a standard thumb drive or USB stick)

Port 3 (30) is connected to a Keyboard (KB) controller chip (16) (comparable to a keyboard chips found in standard computer keyboards)

Port 4 (40) is connected to a Field Programmable Gate Array (FPGA) (42) through a USB to Serial bridge chip (45). (an FPGA or a micro controller with a USB port will eliminate the need for the bridge.) The USB to serial bridge (45) has a serial port (46) and an additional STAG port (44) that enables programming of the FPGA (42) through the USB port (40). The FPGA (42) is programmed with a specific Firmware (not illustrated) to perform its tasks. The FPGA (42) senses the activation of the switches, controls the power to the Drive B (12), Flash Drive (14) and KB (16), turn on and off the LED's and communicate with the software application that runs on the PC or MAC (1000). It is within the spirit and scope of the present invention DittoDrive™ to also be utilized with Mac operating system. The FPGA (42) allows the software to "read" the switches position and to send the FPGA (42) commands. The commands could be to turn off devices if operation is aborted or in case of an error. The commands also could be used to turn on or off LED's to indicate status to the user.

To start a copy operation, a user must physically push a key for the unit to turn on the drive. The Software cannot turn on Drive B, it must be physically activated by the press of a button. A unique feature of the current invention it that in certain condition the software can turn that Drive B on by sending a special command to the FPGA. The FPGA, then turns on the Drive B in a read only mode. This feature allow the user to read information from the Ditto Drive (Drive B) and still retain the full protection against any malware or system corruption. This feature allows a user to see what is happening with the DitoDrive without running the risk that some Malware can be incorporated into the DitoDrive.

The Panel

Referring to FIG. 2, there is illustrated a DittoDrive™ block diagram (5) having four pushbuttons switches and ten LED's on the Dittobox (200).

Switch A (50) has a symbol of a PC on it.
Switch B (52) has a symbol of a drive on it.
Switch C1 (54)—has a label—Copy from PC
Switch C2 (56)—Has a label—Copy from Ditto Each switch has an LED next to it. A and B are working like a toggle switch (A/B switch). When A is pushed its LED (50L) is on and the B LED (52L) is off. When B is pushed its LED is on and the A switch LED is off. The A/B position remains the same even through a power cycle. The last position is stored in the EPROM (43 (a non volatile memory) next to the FPGA.

There are four LED's, one next to each switch. The LED's next to A and B switches are on, based on the last activation. If A was pushed last, the LED next to it is on. If B was pushed the last LED next to B is on. The LED's next to C1 (54L) and C2 (56L) are on temporarily when a respective switch is pushed.

LED's 5 to 9 (65,66,67,68 and 69) are turning on in a sequence to show the direction of the copy, either from left to right or from right to left. LED 10 (70) is on when the USB port is connected to a "live" USB port of a computer and there is power to the unit.

Description of the Operation

Referring to FIG. 2, there is illustrated a DittoDrive™ block diagram 5.

1. When connected to the PC (1000) through the USB port (6) the only active circuits are the Hub (100) the Flash (14) and the FPGA (42).

2. All the DittoDrive (Ditto) Software (S/W) (not illustrated), applications and Firmware (not illustrated) (F/W) resides on the Flash (14) inside the Ditto box (200).

3. The first time a user connects DittoDrive™ to the computer through the USB port, the computer operating system (O/S) will recognize the DittoDrive™ and ask the user if the user wants to install the Ditto S/W. If the user responds with yes, the computer OS will install the Ditto S/W from the Flash Drive that is inside the Ditto box (200).

4. After the software is installed, the Ditto application will pop up on the screen and ask the user if he wants to clone the user's internal drive to the DittoDrive™ (which is inside the Ditto box (200)). If the user responds with yes, the software prompts the user another option to encrypt the DittoDrive. If the user select this option the user will prompted to enter a password. If two way authentication is selected the user will have to use a smartphone or another authentication device to start the operation.

Then the software prompts the user:

"Make sure that the PC/Ditto (A/B) switches on the DittoDrive™ box (200) is set to PC (A). The A position is marked with a symbol of a PC and an LED next to the switch is on when the system is in position A. If the PC is not on, push the PC switch (50) to turn it on. Then push the Copy from PC button (C1) (54) on the DittoDrive™ Box (200) to initiate the cloning process. Alternatively, a visual prompt appears on the computer screen to guide the steps of the user. Also, right to left copies from Ditto to PC and left to right copies PC to Ditto.

5. The cloning process is started and the sequence LED's (5-9) (65,66,67,68 and 69) will turn on one after another from left to right indicating the data flow direction and activity. The Software prompt: "This may take a while based on your internal data size." Progress indicator as well as time elapsed, time left to finish, data to be transferred, data transferred and transfer speed are displayed on the computer screen. Alternatively, a visual prompt appears on the computer screen to guide the steps of the user.

6. If an error occurs, or if the user decides to cancel the cloning process by selecting the cancel button on the computer screen, the Software sends commands to the FPGA (42) to turn off the Drive and the sequence LEDs.

7. When the cloning process is completed, the S/W prompts the user: "All your data, applications, password and settings are securely cloned to the Ditto box, do you want to test your backup by rebooting your computer from the Ditto now?" If the user responds with Yes, the software prompts: "Press the Ditto button and the system will allow the user to boot from your Ditto box." Alternatively, a visual prompt appears on the computer screen to guide the steps of the user. When the software senses that the Ditto button (52) was pressed, it restarts the computer and sends a command to the FPGA (42) to set Software boot mode. In boot mode the FPGA (42) turns on the Ditto Hard Drive (B) (12), the KB controller (16), and start flashing the Ditto LED (52L) to let the user know that the unit is in boot mode and the hard drive is on.

7.01 The software then send commands to the FPGA to send a key stroke sequence that tells the computer to activate the boot manager that allow the user to boot from an external USB port. Or alternatively, if allowed by the OS (operating system) it will tell the computer which device to boot from. The key combination that activates the computer boot manager is different for Mac or PC. The software "tells" the FPGA (42) which key combination to send. The software can also program the KB controller (16) with a predefined key combination. The FPGA (42) controls the key selection circuit 17 of the keyboard 16. The key selection circuit 17 assigns rows 161 and columns 162 for a key function which is software programmed into a keyboard controller 16. One of the unique features of the present invention is the key board controller chip which communicates with the FPGA 42 which provides information as to whether the keyboard has been scanned so that the keyboard can be turned off.

Figure 3:
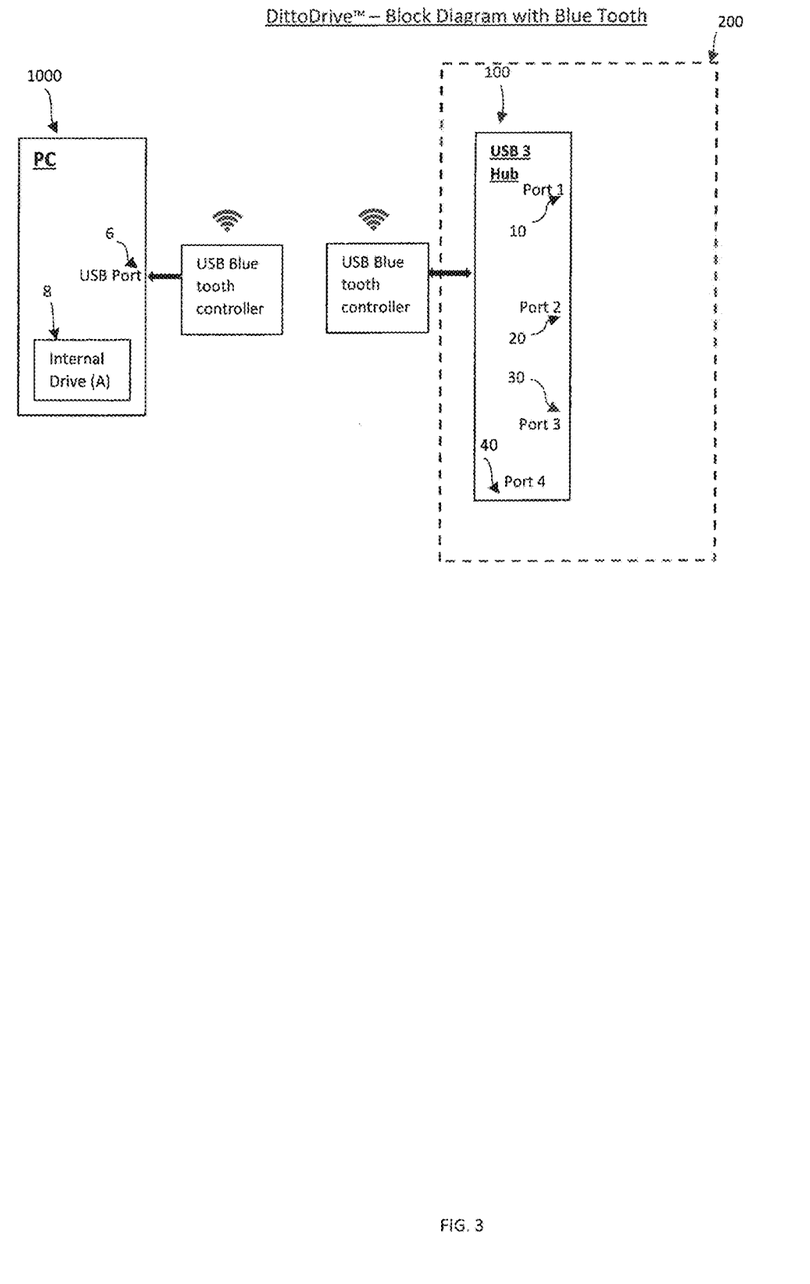
FIG. 3 is a continuation of FIG. 2 but illustrating how the present invention DITTO Drive is connected to a PC or a MAC through a Bluetooth connection.
Figure 4:
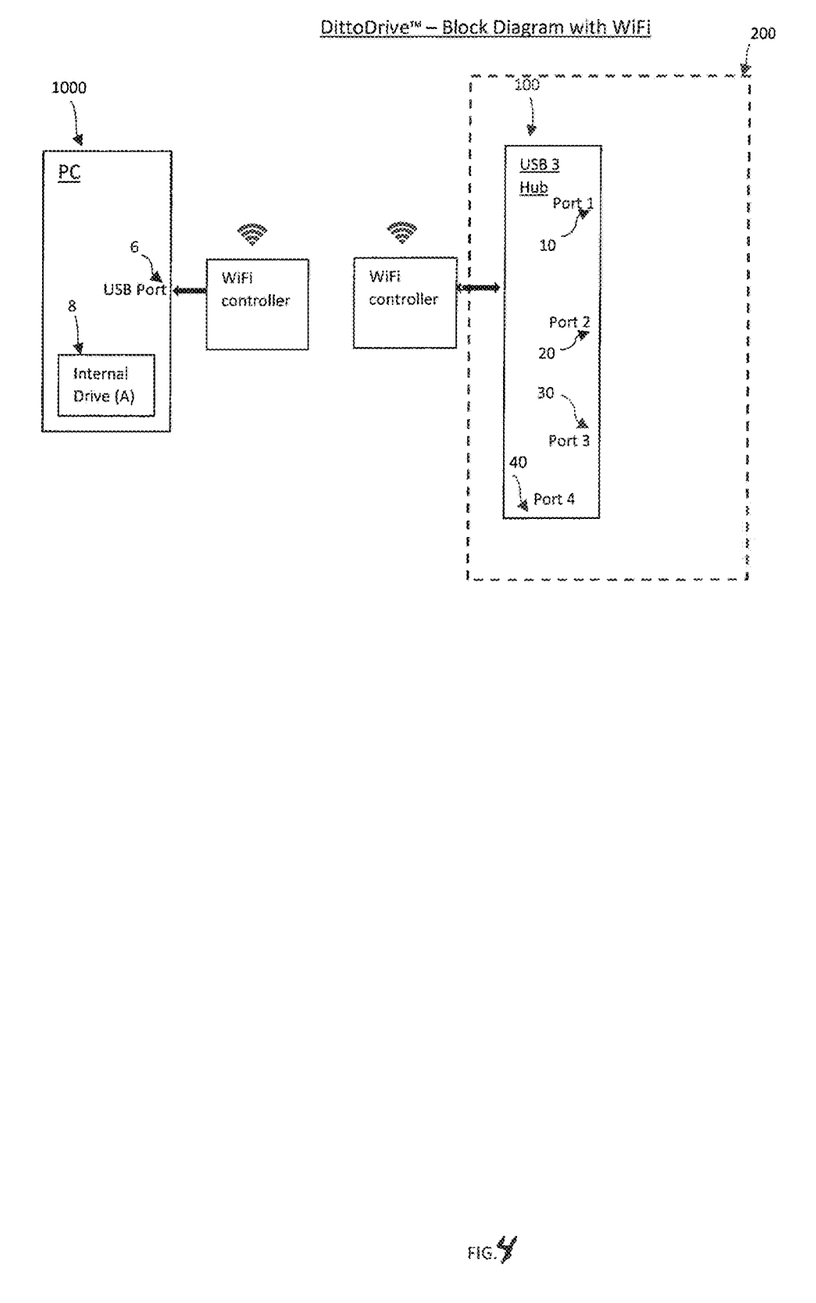
FIG. 4 is a continuation of FIG. 2 but illustrating how the present invention DITTO Drive is connected to a PC or a MAC through a wireless Wi-Fi connection.
Figure 5:
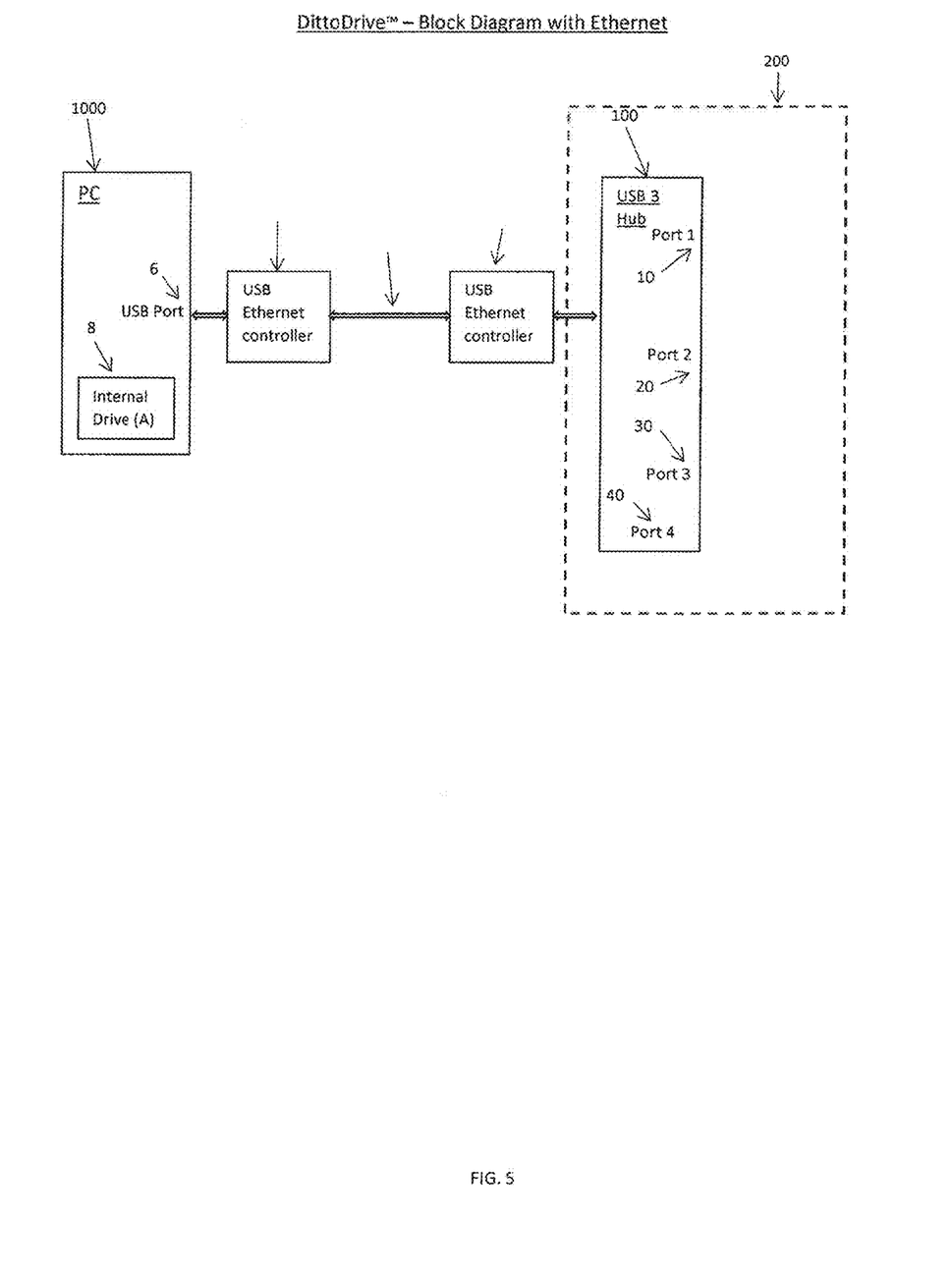
FIG. 5 is a continuation of FIG. 2 but illustrating how the present invention is connected to a PC or MAC through an Ethernet connection.

7.02 In FIG. 2, there is a hard cable between the USB hub and the PC which is numbered 700. Referring to FIG. 3, this cable is replaced with a wireless connection which is a wireless Bluetooth controller. Referring to FIG. 4, the hard wired cable connection in FIG. 2 is replaced with a USB WIFI controller. In FIG. 5, this same connection is replaced with an Ethernet connection.

Figure 6:
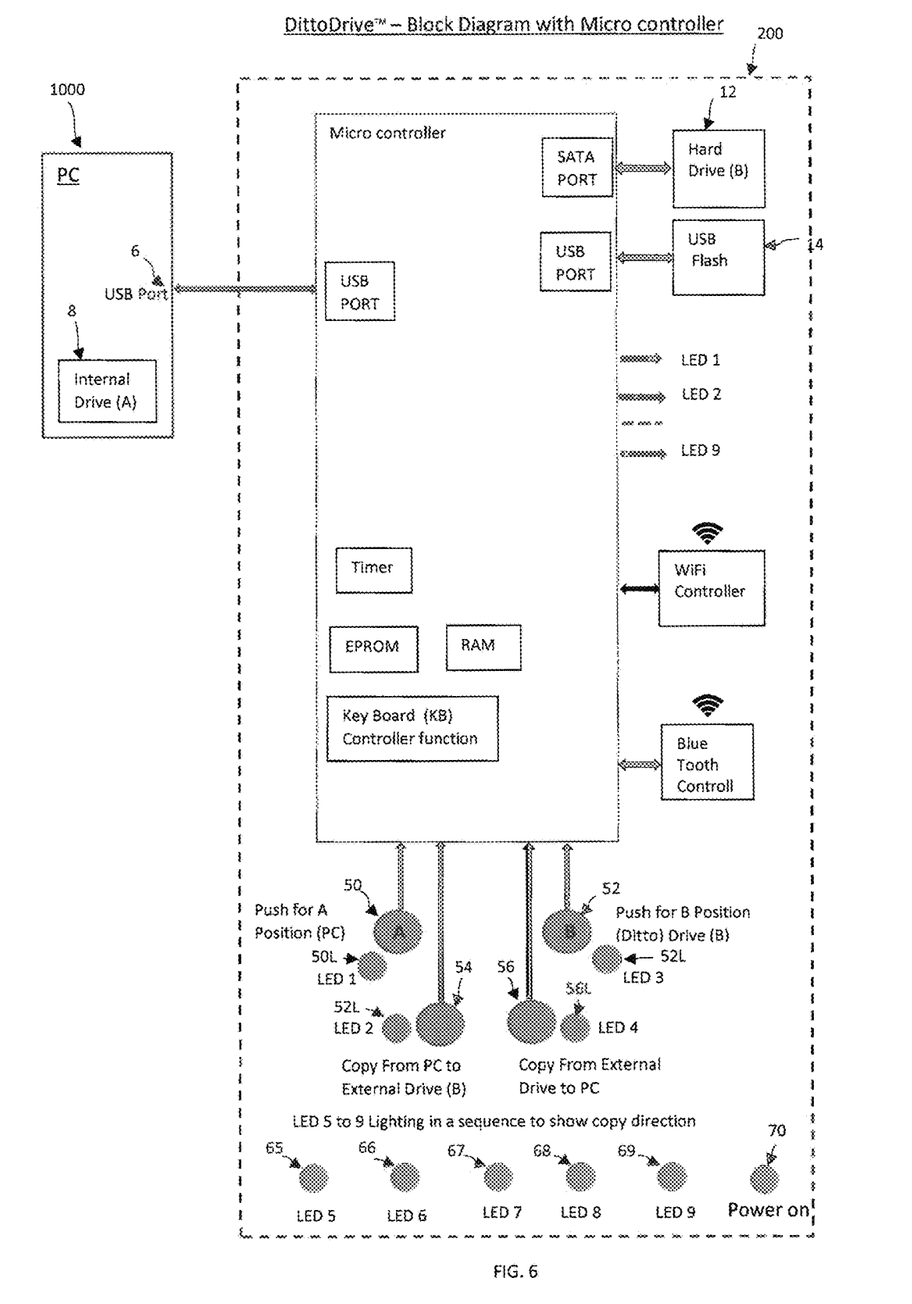
FIG. 6 is a block diagram of a variation of the present invention illustrating the present invention incorporating a microcontroller replacing a number of the elements illustrated in FIG. 2.
Figure 7:
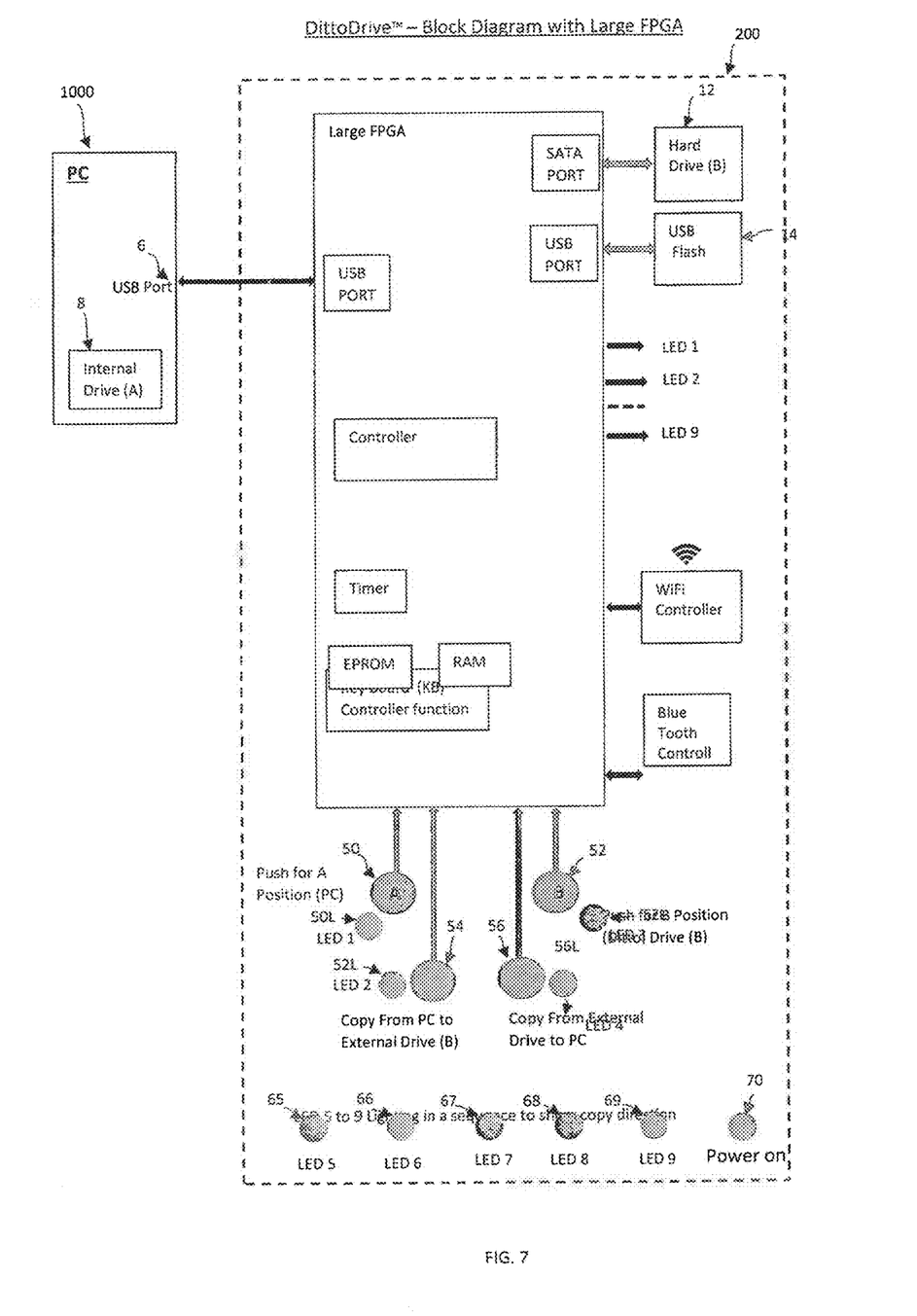
FIG. 7 is another variation of the present invention utilizing a large programmable gate array replacing the small programmable gate array illustrated in FIG. 2, the large programmable gate array replacing a number of the other elements illustrated in FIG. 2, but also utilizing a USB hard drive connected to either a PC or MAC computer.

7.03 In FIG. 6, a microcontroller is used to run the Dittodrive and this replaces the FPGA, the USB to serial chip, the power control, the keyboard controller, USB to SATA Bridge, the keyboard selection circuit, and the USB Hub. This is an important feature of the Ditto unit, which makes it so much simpler to operate. The user does not have to know or remember any unique key combination for the special reboot activity. Another unique feature of this invention is that the software also sends commands to the FPGA to tell it when to simulate a key sequence and when to turn the KB off during the boot process, so it will not interfere with other computer functions. During the boot process, the application software is not running since the computer is still not booted and the OS is not running. It has to be done by the FPGA by activating predefined functions.

8. If the DittoDrive is encrypted, during the boot process the user will be prompted to enter his password, and if two way authentication is selected, the user will need to use another authentication device to continue the boot with DittoDrive. After the reboot, the user will not notice any significant difference in the way the user's computer operates. The user will also not notice any significant difference in the computer screen display and/or information. The user will be able to continue to work just like it was working from its internal drive.

9. The user can now reboot the user's computer to go back to normal operation or continue to work from the Ditto drive. Upon reboot the Software senses if the user booted from the computer internal drive or from the Ditto drive. If booted from the internal drive and the Ditto unit is still connected and still in boot mode the ditto application software will send a command to the FPGA (42) to turn off boot mode, which turns off the Ditto Hard drive (B). The KB controller (16) was turned off by the FPGA during the boot process.

10. The user now has a complete cloned backup on the DittoDrive™. DittoDrive™ is turned off and is not accessible by the O/S and cannot be turned on by Software, or Malware of any kind. Only a switch on the DittoDrive box (200) can turn it on again. From now on the software sends incremental backups on a preselected schedule and criteria to the internal Flash. The internal flash (14) is always connected when the Ditto unit is connected to the computer. If the user signed up for the Ditto Cloud (WEB) service or other comparable cloud services, the Software can send the incremental backups to the WEB as well. Also, the Ditto can be turned on by the user but then this is only in the read only mode as previously discussed.

11. If the computer hard drive (1) is corrupted, the user connects the DittoDrive unit to the computer via the USB port (6). The user is then required to turn on the computer, press the Ditto button (B) on the Ditto box (200) for 3 seconds to get into hardware boot mode and reboot the computer/PC (1000). The FPGA (42) will turn on the Drive and the KB controller (16) inside the Ditto unit which will tell the computer to activate the boot manager and allow the user to select to boot from the DittoDrive™. The other hardware variation to get into boot mode is described in detail above. The idea is that if the computer crashes then the software is not accessible so it has to be done physically and Ditto Drive is programmed to allow the computer to boot.

12. After booting, the FPGA (42) will turn off the KB controller (16) and the user continues to work from the Ditto unit, which will be identical to the time of the clone. The details are described above.

13. The user can now start working a minute after the "crash". The user has all his links, Passwords, Settings and applications. The user is only missing the data since the last cloning.

14. The user can read or retrieve individual files from the Ditto flash or restore all of it, if the incremental backup (the changes from the last cloning) was done to the flash. Alternatively, the user can restore the incremental backup data from the Web if a Web service, or Ditto Web service was activated.

15. The user has two (2) options:
   a. Restore the incremental to the DittoDrive™; OR
   b. Clone back from the DittoDrive™ to the computer internal drive (see section 19), and then start to work from the user's internal drive again and then restore the incremental to the internal drive. Option b is more secure. It leaves the Ditto copy unchanged.

16. The Ditto software will prompt the user: "Do you want to restore the increment backup now" Alternatively, a visual prompt appears on the computer screen to guide the steps of the user.

17. If yes, it will show a menu that allows the user to select:
   a. From Flash
      i. From last backup
      ii. From a certain date
   b. From Web
      i. From last backup
      ii. From a certain date 18. Upon restoration of the incremental backup, the Ditto (or the computer drive if it was cloned back) contains an up to the minute good working copy of the user data, applications, passwords and settings. It is just like the original drive before the crash. Therefore, the system is now restored just before the crash and this takes a matter of minutes.

19. Clone back—It is important feature of the Ditto system. After booting from the Ditto drive (B), the user can press the "copy from Ditto" button (C2) (56) and this will initiate a copy from Ditto to the internal drive of the computer. Or any other selected drive. There are two options: Clone back or Fast clone. Clone back will erase the destination drive and replace it with the content of the DittoDrive. Fast clone will synchronize the destination drive with the content of the DittoDrive.

20. After pressing the button (C2) (56), the software will prompt the user: "this operation will wipe out everything on the internal or other destination drive and replace it with the content of the DittoDrive™. Are you sure" Alternatively, a visual prompt appears on the computer screen to guide the steps of the user.

21. Upon "Yes, the cloning process will start. The user can continue to work on his computer (working from Ditto) while the cloning is going on. Alternatively, a visual prompt appears on the computer screen to guide the steps of the user.

22. When the copy is completed, the user can press the Computer button (C1) (50) on the Ditto box (200) and reboot the user's PC/computer (1000). It will now work from its internal drive.

23. Another unique feature is that the user can connect the Ditto box (200) to a second similar computer that it was cloned from and boot from it and work on the new computer like it was the user's first computer. The computer systems have to match and that the PC has to go to another PC and a MAC has to go to another MAC. Another benefit of the present invention is you can take the Dittodrive and work on another PC by directly booting from the Dittodrive. This operation further will allow a user to work from a secondary computer without the possibility of damaging the second computer since the booting will occur from the Dittodrive.

24. The present invention also includes a Near-field communication (NFC). NFC is an authentication protocol within the present invention to confirm that the person using the DittoDrive is the correct person. The NFC confirms the authentication between two electronic devices, one of which is usually a portable device such as a smartphone, to establish communication by bringing them within 4 cm (1.6 in) of each other. There is an optional hardware encryption box between the USB and the SATA Bridge so that all the cloning is encrypted. Standard encryption methods known are also applicable and within the spirit and scope of the present invention.

In addition, the present invention will allow a Smartphone to be backed up or cloned using the same process as outlined above. This will work for both androids and Apple® phones. You can also clone and backup multiple PCs or smartphones and the software will let a person know where each is stored within the present invention.

Of course the present invention is not intended to be restricted to any particular form or arrangement, or any specific embodiment, or any specific use, disclosed herein, since the same may be modified in various particulars or relations without departing from the spirit or scope of the claimed invention hereinabove shown and described of which the apparatus or method shown is intended only for illustration and disclosure of an operative embodiment and not to show all of the various forms or modifications in which this invention might be embodied or operated.

What is claimed is:

1. An apparatus for the backup and recovery of a computer memory storage system of a computer by a user, the apparatus comprising:
   a backup memory storage system for copying thereon a portion of, or a clone of, all contents of the computer memory storage system;
   a keyboard controller;
   a first hardware switch being manually-activatable by the user;
   a second hardware switch being manually-activatable by the user;
   control circuitry programmed to
      (a) require the manual activation of the first hardware switch as a pre-condition to cause the backup memory storage system to
         (i) power on, or
         (ii) become writable; and
      (b) responsive to the manual activation of the second hardware switch, cause the keyboard controller to execute a boot manager keystroke sequence, wherein the boot manager key stroke sequence
         (i) includes a key combination effective for activating a boot manager of the computer, and
         (ii) is not input by the user;
   a computer interface element by which the apparatus is configured to communicate with the computer; and
   a box
      (a) housing the backup memory storage system, the keyboard controller, the control circuitry and the computer interface element; and
      (b) on which the switches are mounted.

2. An apparatus as defined in claim 1 comprising a third hardware switch being manually-activatable by the user, wherein the control circuitry is programmed to initiate a said copying of a said clone responsive to the manual activation of the third hardware switch.

3. An apparatus as defined in claim 2 wherein the copying is by way of a software program installed on the computer.

4. An apparatus as defined in claim 1 wherein the control circuitry is programmed to cause the backup memory storage system to power off once the copying of said clone is completed.

5. An apparatus as defined in claim 4 comprising a flash drive within the box, wherein the control circuitry is programmed to allow incremental backups of the contents of the computer memory storage system to the flash drive while the backup memory storage system is powered off.

6. An apparatus as defined in claim 1 wherein the control circuitry is programmed to cause the keyboard controller to execute a reboot keystroke sequence responsive to the manual activation of the second hardware switch, wherein the reboot keystroke sequence
   (a) precedes the respective boot manager key stroke sequence;
   (b) includes a key combination effective for rebooting the computer; and
   (c) is not input by the user.

7. An apparatus as defined in claim 6 wherein the boot manager key stroke sequence includes a key combination effective for causing the computer to boot from the apparatus instead of from the computer memory storage system.

8. An apparatus as defined in claim 6 comprising a fourth hardware switch manually-activatable by the user, wherein the control circuitry is programmed to cause the keyboard controller to execute a restore keystroke sequence responsive to the manual activation of the fourth switch, wherein the restore keystroke sequence
   (a) includes a key combination effective to instruct a software program installed on the computer to overwrite the computer memory storage system with a said clone; and
   (b) is not input by the user.

9. An apparatus as defined in claim 1 wherein the control circuitry comprises
   (a) a Field Programmable Gate Array (FPGA); and
   (b) a key selection circuit in
      (i) controlled communication with the FPGA; and
      (ii) controlling communication with the keyboard controller, wherein the key selection circuit is configured to assign row and column numbers of corresponding keys to the keyboard controller.

10. An apparatus as defined in claim 1 comprising a connection hub disposed in communication between the computer interface element and
    (a) the backup memory storage system;
    (b) the keyboard controller; and
    (c) the control circuitry.

11. An apparatus as defined in claim 10 comprising a flash drive, wherein the connection hub is disposed in communication between the computer interface element and the flash drive.

12. An apparatus as defined in claim 1 wherein the control circuitry comprises a microcontroller including the keyboard controller.

13. An apparatus as defined in claim 1 wherein the hardware switches are pushbuttons.

14. An apparatus as defined in claim 1 wherein the box includes a visually perceptible copy direction indicator thereon for indicating the direction of copy between the computer memory storage system and the backup memory storage system.

15. An apparatus as defined in claim 1 wherein the box is external to the computer.

16. An apparatus as defined in claim 1 wherein the computer interface element comprises at least one of a USB port, Wi-Fi controller or Bluetooth controller.

17. An apparatus as defined in claim 1 comprising an encryption circuit disposed in communication between the computer interface element and the backup memory storage system, the encryption circuit being programmed to encrypt the clone during the copying if so instructed by way of a software program on the computer.

18. An apparatus as defined in claim 17 wherein the encrypted clone requires a password or two-way authentication to decrypt.

19. An apparatus for the backup and recovery of a computer memory storage system of a computer by a user, the apparatus comprising:
    a backup memory storage system for copying thereon a portion of, or a clone of, all contents of the computer memory storage system;
    a flash drive;
    a keyboard controller;
    a first switch;
    a second switch;
    control circuitry programmed to
       (a) require the activation of the first switch as a precondition to cause the backup memory storage system to
          (i) power on, or
          (ii) become writable; and
       (b) responsive to the activation of the second switch, cause the keyboard controller to execute a boot manager keystroke sequence, wherein the boot manager key stroke sequence
          (i) includes a key combination effective for activating a boot manager of the computer, and
          (ii) is not input by the user;
       (c) to cause the backup memory storage system to power off once the copying of a said clone is completed; and
       (d) to allow incremental backups of the contents of the computer memory storage system to the flash drive while the backup memory storage system is powered off;
    a computer interface element by which the apparatus is configured to communicate with the computer; and
    a box housing the backup memory storage system, the keyboard controller, the control circuitry, the flash drive and the computer interface element.

20. An apparatus for the backup and recovery of a computer memory storage system of a computer by a user, the apparatus comprising:
    a backup memory storage system for copying thereon a portion of, or a clone of, all contents of the computer memory storage system;
    a keyboard controller;
    a first switch;
    a second switch;
    control circuitry programmed to
       (a) require the activation of the first switch as a precondition to cause the backup memory storage system to
          (i) power on, or
          (ii) become writable; and (b) responsive to the activation of the second switch, to cause the keyboard controller to execute a reboot keystroke sequence, wherein the reboot keystroke sequence
 (i) includes a key combination effective for rebooting the computer, and
 (ii) is not input by the user;
(c) responsive to the activation of the second switch, cause the keyboard controller to execute a boot manager keystroke sequence, wherein the boot manager key stroke sequence
 (i) includes a key combination effective for activating a boot manager of the computer,
 (ii) includes a key combination effective for causing the computer to boot from the apparatus instead of from the computer memory storage system, and
 (iii) is not input by the user;
a computer interface element by which the apparatus is configured to communicate with the computer; and
a box housing the backup memory storage system, the keyboard controller, the control circuitry and the computer interface element.

21. An apparatus for the backup and recovery of a computer memory storage system of a computer by a user, the apparatus comprising:
a backup memory storage system for copying thereon a portion of, or a clone of, all contents of the computer memory storage system;
a flash drive;
a keyboard controller;
a first switch;
a second switch;
control circuitry programmed to
 (a) require the activation of the first switch as a precondition to cause the backup memory storage system to
  (i) power on, or
  (ii) become writable; and
 (b) responsive to the activation of the second switch, to cause the keyboard controller to execute a reboot keystroke sequence, wherein the reboot keystroke sequence
  (i) includes a key combination effective for rebooting the computer, and
  (ii) is not input by the user;
 (c) responsive to the activation of the second switch, cause the keyboard controller to execute a boot manager keystroke sequence, wherein the boot manager key stroke sequence
  (i) includes a key combination effective for activating a boot manager of the computer,
  (ii) includes a key combination effective for causing the computer to boot from the apparatus instead of from the computer memory storage system, and
  (iii) is not input by the user;
 (d) to cause the backup memory storage system to power off once the copying of a said clone is completed; and
 (e) to allow incremental backups of the contents of the computer memory storage system to the flash drive while the backup memory storage system is powered off;
a computer interface element by which the apparatus is configured to communicate with the computer; and
a box housing the backup memory storage system, the keyboard controller, the control circuitry, the flash drive and the computer interface element.

* * * * *